(12) United States Patent
Carrillo

(10) Patent No.: US 6,666,568 B1
(45) Date of Patent: Dec. 23, 2003

(54) COMPUTER LIGHT

(76) Inventor: Carl L. Carrillo, P.O. Box 10909, Hilo, HI (US) 96721

( * ) Notice: Subject to any disclaimer, the term of this patent is extended or adjusted under 35 U.S.C. 154(b) by 0 days.

(21) Appl. No.: 10/033,789

(22) Filed: Jan. 3, 2002

Related U.S. Application Data
(60) Provisional application No. 60/301,471, filed on Jun. 29, 2001.

(51) Int. Cl.[7] .................................................. F21V 33/00
(52) U.S. Cl. ........................ 362/253; 345/156; 345/163; 345/164; 345/166; 345/167; 345/168; 345/169
(58) Field of Search ........................ 362/253; 345/156, 345/163, 164, 166, 167, 168, 169

(56) References Cited

U.S. PATENT DOCUMENTS

| 4,143,283 A | | 3/1979 | Graf et al. |
|---|---|---|---|
| 4,315,162 A | | 2/1982 | Ferguson |
| 5,185,564 A | | 2/1993 | Miller |
| 5,200,685 A | | 4/1993 | Sakamoto |
| 6,091,404 A | * | 7/2000 | Hong et al. .................. 345/167 |
| 6,386,724 B2 | * | 5/2002 | Naghi .......................... 362/85 |
| 2001/0048409 A1 | * | 12/2001 | Kim .............................. 345/82 |

* cited by examiner

Primary Examiner—Stephen Husar
Assistant Examiner—Mark Tsidulko
(74) Attorney, Agent, or Firm—Patent & Trademark Services; Joseph H. McGlynn

(57) ABSTRACT

A light which is electrically connected to a computer power supply and which is powered by rechargeable batteries that are recharged by power from the computer to illuminate the inside of the computer when working on it.

6 Claims, 1 Drawing Sheet

COMPUTER LIGHT

Applicant claims priority of Provisional S.No. 60/301,471, filed Jun. 29, 2001

BACKGROUND OF THE INVENTION

This invention relates, in general, to lights, and, in particular, to lights which are electrically secured to a computer so the inside of the computer is illuminated.

DESCRIPTION OF THE PRIOR ART

In the prior art various types of have been proposed. For example, U.S. Pat. No. 5,200,685 to Sakamoto discloses an adapter for selectively connecting an external battery to a portable computer.

The patent to Graf et al discloses a battery backup system which provides DC power in the event of an AC power failure.

The patent to Ferguson discloses a reserve power supply including first and second batteries which are switchably connected in series or parallel to the computer.

The patent to Miller discloses a discharge apparatus for the continuous discharge of appliance batteries.

SUMMARY OF THE INVENTION

The present invention is directed to a light which is electrically connected to a computer's power supply and which draws power from the computer to illuminate the inside of the computer when working on it.

It is an object of the present invention to provide a new and improved light for a computer.

It is an object of the present invention to provide a new and improved light for a computer which draws power from the computer.

It is an object of the present invention to provide a new and improved light for a computer which illuminates the inside of the computer.

These and other objects and advantages of the present invention will be fully apparent from the following description, when taken in connection with the annexed drawings.

DESCRIPTION OF THE PREFERRED EMBODIMENT

Figure 1:
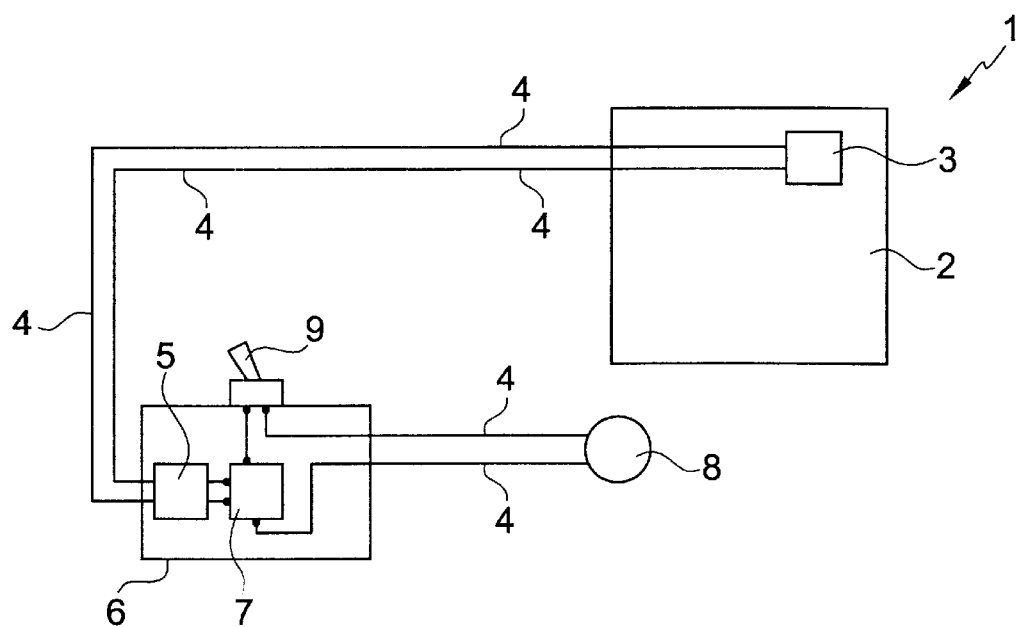
FIG. 1 is a schematic view of the present invention.

Referring now to the drawings in greater detail, FIG. 1 shows a schematic view of the present invention. The present invention 1 comprises a light 8 which is electrically attached to a power supply 3 of a computer 2, to enable a user to illuminate the inside of the computer when he/she is working on the inside of the computer. Usually, this type of light would be most useful when a person is attempting to attach peripherals, such as modems, sound cards, etc. It would also be advantageous when a person is attaching any new accessory to a computer.

Usually, when putting in components, you unplug the computer to prevent shocks to the person working on the computer and to protect components inside the computer. A person working on the computer will then use a flashlight or lamp to look inside the computer to make the desired changes. The present invention comprises a light which is electrically secured to a computer so the inside of the computer can be illuminated. Since the light receives its power from batteries recharged by the computer power supply, so there is no need to plug the light into a separate source of electrical power. This reduces the tangle of wires around most computers by at least one.

As shown in FIG. 1, a light 8 is electrically connected to a housing 6 by means of electrical conductors 4. Inside the housing 6 is a battery charging compartment 7 for housing (both mechanically and electrically) rechargeable batteries (not shown). The rechargeable batteries are conventional batteries and the number of batteries will depend on the voltage necessary to power the light 8.

The housing 6 also has a switch 9, electrically and mechanically connected thereto. The specific type of switch used is not critical and any conventional switch can be used, as long as it will perform its intended function. Conductors 4 connect the battery charger 7 to a voltage regulator 5, which in turn is electrically connected by conductors 4 to the conventional computer power supply 3 mounted within the computer 2.

The voltage regulator 5 can be any conventional regulator, and will be used to adjust the voltage produced by the power supply 3 so it matches the voltage needed to recharge the batteries (not shown) in the compartment 7. That is, if the voltage produced by the power supply 3 is too low to recharge the batteries, the voltage regulator 5 will step up the voltage from the power supply 3. If the voltage produced by the power supply 3 is too high, and might damage the batteries, the voltage regulator 5 will step down the voltage from the power supply 3.

Also, it should be noted that the light 8 can be either physically mounted on the housing 6 or it can be merely electrically connected to the housing, so it can be maneuvered to best advantage by the user. In addition, the light could be mounted on a flexible stand so the stand could be twisted and turned, without moving the housing 6, until the light is positioned to best serve the needs of the user.

The electrical circuit used with the FIG. 1 device recharges the batteries when the computer is plugged in, and when the computer is unplugged, which is necessary when working on the inside of the computer for safety reasons, the batteries will operate the light 8.

Figure 2:
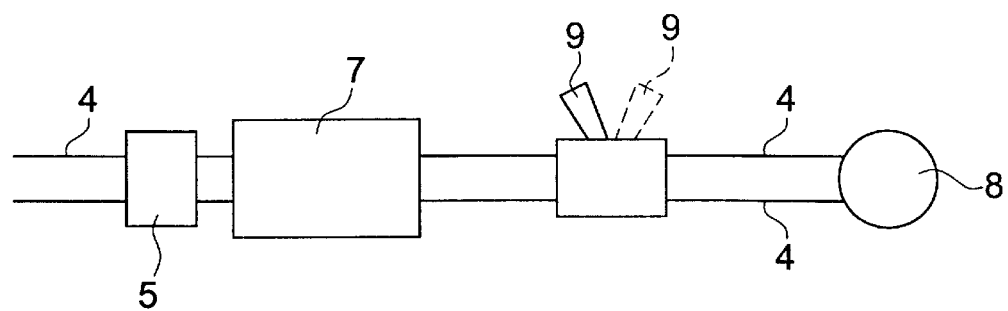
FIG. 2 is a side view of another embodiment of the present invention.

Another embodiment of the present invention is shown in FIG. 2. In this embodiment, the invention is essentially the same as shown in FIG. 1, except the housing 6 is not used. The light 8 is electrically connected to the switch 9 by conductors 4 which connect the switch to the battery compartment 7 which contains the same rechargeable batteries as in FIG. 1. The compartment 7 is then connected to the voltage regulator 5 which is, in turn, connected to the power supply in the computer (not shown in FIG. 2, but shown in FIG. 1). The FIG. 2 device can be used in the same manner as a trouble light.

In order to use the present invention, it would be electrically connected to the power supply 3 in the computer 2 as shown in FIG. 1. Since all of the electrical connections used with the present invention are conventional, a specific description is not necessary and will not be given. Once the proper electrical connections are made, the switch 9 is placed in the first position which will allow power from the power supply 3 to be passed to the charging compartment 7 which will charge the batteries therein. In this position of the switch 9, no power will be supplied to the light 8.

When the user needs the light to illuminate the inside of his/her computer, the switch 9 is turned to a second position (as shown by the dotted lines in FIG. 2). In this position, the power coming from the power supply 3 will be interrupted (if the computer is still connected to a source of power), and power will be sent from the rechargeable batteries to the light 8. In this manner, the only time the light is on is when it is needed. This will preserve the batteries powering the light so they will be available when needed.

Although the COMPUTER LIGHT and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A source of illumination for a computer, said computer having a source of power for operating said computer, said source of illumination comprising:

a light, said source of illumination having means for supplying power to said light, means for connecting said means for supplying power to said light to a power supply in said computer, means for electrically disconnecting said means for supplying power to said light from said power supply in said computer, and said means for supplying power to said light supplies power to said light only when said power supply in said computer is electrically disconnected from said source of power for operating said computer.

2. The source of illumination for a computer as claimed in claim 1, wherein said means for supplying power to said light is at least one battery.

3. The source of illumination for a computer as claimed in claim 1, wherein said means for electrically disconnecting said means for supplying power to said light from said power supply in said computer is a switch, said switch being movable from a first position to a second position, and when said switch is in said first position, power is supplied from said power supply in said computer to said means for supplying power to said light, and when said switch is in said second position, power is not supplied from said power supply in said computer to said means for supplying power to said light.

4. The source of illumination for a computer as claimed in claim 1, wherein said means for supplying power to said light is at least one rechargeable battery.

5. The source of illumination for a computer as claimed in claim 1, wherein said source of illumination includes a means for regulating power connected between said means for supplying power to said light and said power supply in said computer.

6. The source of illumination for a computer as claimed in claim 5, wherein said means for regulating power is a voltage regulator.

\* \* \* \* \*